(12) United States Patent
Masoudipour et al.

(10) Patent No.: US 7,675,209 B2
(45) Date of Patent: Mar. 9, 2010

(54) ELECTRIC MOTOR COOLING JACKET

(75) Inventors: Mike M. Masoudipour, Rancho Palos Verdes, CA (US); Long K. Duong, Lakewood, CA (US)

(73) Assignee: Honeywell International Inc., Morristown, NJ (US)

( * ) Notice: Subject to any disclaimer, the term of this patent is extended or adjusted under 35 U.S.C. 154(b) by 438 days.

(21) Appl. No.: 11/670,371

(22) Filed: Feb. 1, 2007

(65) Prior Publication Data

US 2008/0185924 A1    Aug. 7, 2008

(51) Int. Cl.
*H02K 9/00* (2006.01)
(52) U.S. Cl. .......................................... 310/89; 310/57
(58) Field of Classification Search .................. 310/89, 310/52–64
See application file for complete search history.

(56) References Cited

U.S. PATENT DOCUMENTS

| | | | |
|---|---|---|---|
| 2,862,120 A * | 11/1958 | Onrud | ........................ 310/54 |
| 3,060,335 A | 10/1962 | Greenwald | |
| 3,567,975 A * | 3/1971 | Biesack et al. | ................ 310/54 |
| 4,644,210 A | 2/1987 | Meisner et al. | |
| 5,091,666 A | 2/1992 | Jarczynski | |
| 5,220,233 A | 6/1993 | Birch et al. | |
| 5,859,482 A * | 1/1999 | Crowell et al. | ................ 310/58 |
| 5,923,108 A | 7/1999 | Matake et al. | |
| 6,091,174 A | 7/2000 | Genster | |
| 6,617,715 B1 | 9/2003 | Harris et al. | |
| 6,900,561 B2 | 5/2005 | Vlemmings et al. | |
| 6,909,210 B1 | 6/2005 | Bostwick | |

* cited by examiner

*Primary Examiner*—Dang D Le
(74) *Attorney, Agent, or Firm*—Oral Caglar, Esq.

(57) ABSTRACT

A cooling jacket of an electric motor or generator includes a cylindrical inner sleeve, a cylindrical outer sleeve coaxially surrounding the inner sleeve and forming a circular space between the outer sleeve and the inner sleeve, and a passageway extending within the circular space between the outer sleeve and the inner sleeve. The passageway may be a continuous winding path that may extend axially back and forth along the circumference of said inner sleeve. An embodiment of the present invention provides a cooling jacket that is suitable for, but not limited to, applications in the aircraft and aerospace industries, for example in air-conditioning systems. The cooling jacket as in one embodiment of the present invention may be leak proof and water tight, has a compact design, and may be easily assembled and integrated into an electrically driven machine, such as an electrically driven compressor.

15 Claims, 5 Drawing Sheets

ELECTRIC MOTOR COOLING JACKET

BACKGROUND OF THE INVENTION

The present invention generally relates to electric motors/generators and electrically driven compressors and, more particularly, to a cooling jacket of a dry-liquid cooled electric motor/generator and a method for dry liquid cooling an electric motor/generator of an electrically driven compressor.

Electric motors or generators typically generate a substantial amount of heat during operation, especially if operated at high speeds. Consequently, an electric motor or generator needs to be cooled in order to avoid damage and to ensure smooth and efficient operation of the motor or generator. Since the heat transfer coefficient for cooling using a liquid is generally much higher than the heat transfer coefficient for air, the stator of an electric motor or generator is often cooled with a liquid coolant.

During wet liquid cooling, the stator iron stack and the stator winding end turns are typically completely immersed in a cooling liquid, such as oil. Heat is extracted from the stator by conducting the heat from the stator core and winding to the cooling liquid. Wet liquid cooling of the stator requires sealing the rotor from the space surrounding the stator and is limited to the use of nonconductive liquids, since the stator winding end turns typically are immersed in the cooling liquid as well.

Dry liquid cooling of the stator is often used as an alternative to wet liquid cooling and utilizes in many cases a cooling jacket that surrounds the iron stack and winding of the stator, for example, U.S. Pat. Nos. 5,220,233, 5,923,108, 6,617,715, and 6,909,210. A cooling liquid, which may be a conductive liquid such as water or a water-based cooling liquid, is typically circulated through channels within the cooling jacket and heat is transferred from the stator through direct contact of the stator with the cooling jacket.

Even though the application of cooling jackets for dry liquid cooling is well known in the art, prior art cooling jackets often have high manufacturing costs, require extensive and complex sealing arrangements, often are not leak proof, and may not distribute the cooling liquid evenly—causing hot spots on the stator core. U.S. Pat. No. 6,900,561, for example, discloses a cooling jacket where the cooling liquid enters the cooling jacket axially in an inclined plane and exits the cooling jacket radially from an inclined plane, which may cause pressure losses in the liquid cooling loop. In other prior art cooling jackets, for example, U.S. Pat. Nos. 5,220,233 and 3,567,975, the cooling liquid travels in helical channels and enters/exits these channels radially, which may lead to even higher pressure losses and uneven distribution of the cooling liquid.

Many prior art cooling jackets, for example, U.S. Pat. Nos. 6,900,561 and 6,617,715, utilize "o"-rings to seal the inner and outer pieces of the cooling jackets. Such "o"-rings may not be leak proof and pressure tight and may show wear over long periods of operation, which may lead to high maintenance or repair costs.

Other prior art cooling jackets, for example, U.S. Pat. No. 5,923,108 may be manufactured form cast iron and, therefore, may be too heavy for aerospace applications. Furthermore, cooling jackets manufactured from iron-based materials may be prone to corrosion. Corrosion products that may build-up within the cooling jacket over time may cause degradation of the heat transfer capability of the cooling jacket.

As can be seen, there is a need for a cooling jacket that is leak proof and pressure tight, that minimizes pressure losses in the liquid cooling loop, and that has a reduced susceptibility to corrosion. Furthermore, there is a need for a cooling jacket that may be manufactured at a lower cost and that may be easier to assemble and to integrate into electrically driven machines than prior art cooling jackets. Still further, there is a need for a method for dry liquid cooling an electric motor or generator, which has a higher cooling efficiency than prior art dry liquid cooling methods and is also applicable in the aerospace industry.

SUMMARY OF THE INVENTION

In one aspect of the present invention, a cooling jacket comprises a cylindrical inner sleeve, a cylindrical outer sleeve, and a passageway. The outer sleeve coaxially surrounds the inner sleeve forming a circular space between the outer sleeve and the inner sleeve. The passageway extends within the circular space between the outer sleeve and the inner sleeve and is a continuous winding path that extends axially back and forth along the circumference of the inner sleeve.

In another aspect of the present invention, a cooling jacket of a dry-liquid cooled electric motor or generator comprises a cylindrical inner sleeve extending longitudinally along an axis, a cylindrical outer sleeve, a first and a second weld joint, a plurality of fins that form a passageway, a first opening and a second opening, a cylindrical bearing housing, and a stator stop. The inner sleeve forms a cylindrical hollow space, and the hollow space receives a stator of the electric motor or generator. The outer sleeve coaxially surrounds the inner sleeve forming a circular space between the outer sleeve and the inner sleeve. The first and the second weld joint permanently attach the outer sleeve to the inner sleeve and hermetically seal the circular space between the outer sleeve and the inner sleeve. The passageway is a continuous winding path that extends axially back and forth along the circumference of the inner sleeve within the circular space between the outer sleeve and the inner sleeve. The first and second opening are positioned across from each other, provide access to the circular space between the inner sleeve and the outer sleeve, and are in fluid connection with the passageway. The bearing housing is integrated into the inner sleeve and is axially placed within the hollow space formed by the inner sleeve and receives a bearing of the electric motor or generator. The stator stop is an axially extending area of the inner surface of the inner sleeve that has a smaller diameter that adjacent areas and contacts an end of a stator of the electric motor or generator.

In a further aspect of the present invention, a method for dry liquid cooling an electric motor or generator comprises the steps of: axially passing a cooling liquid from a back end of a cooling jacket through a first opening into a passageway of the cooling jacket, letting the cooling liquid flow axially back and forth through the passageway along both sides of the circumference of an inner surface of the cooling jacket, and axially passing the cooling liquid out of the passageway of the cooling jacket through a second opening positioned at the back end and across from the first opening.

These and other features, aspects and advantages of the present invention will become better understood with reference to the following drawings, description and claims.

DETAILED DESCRIPTION OF THE INVENTION

Figure 1:
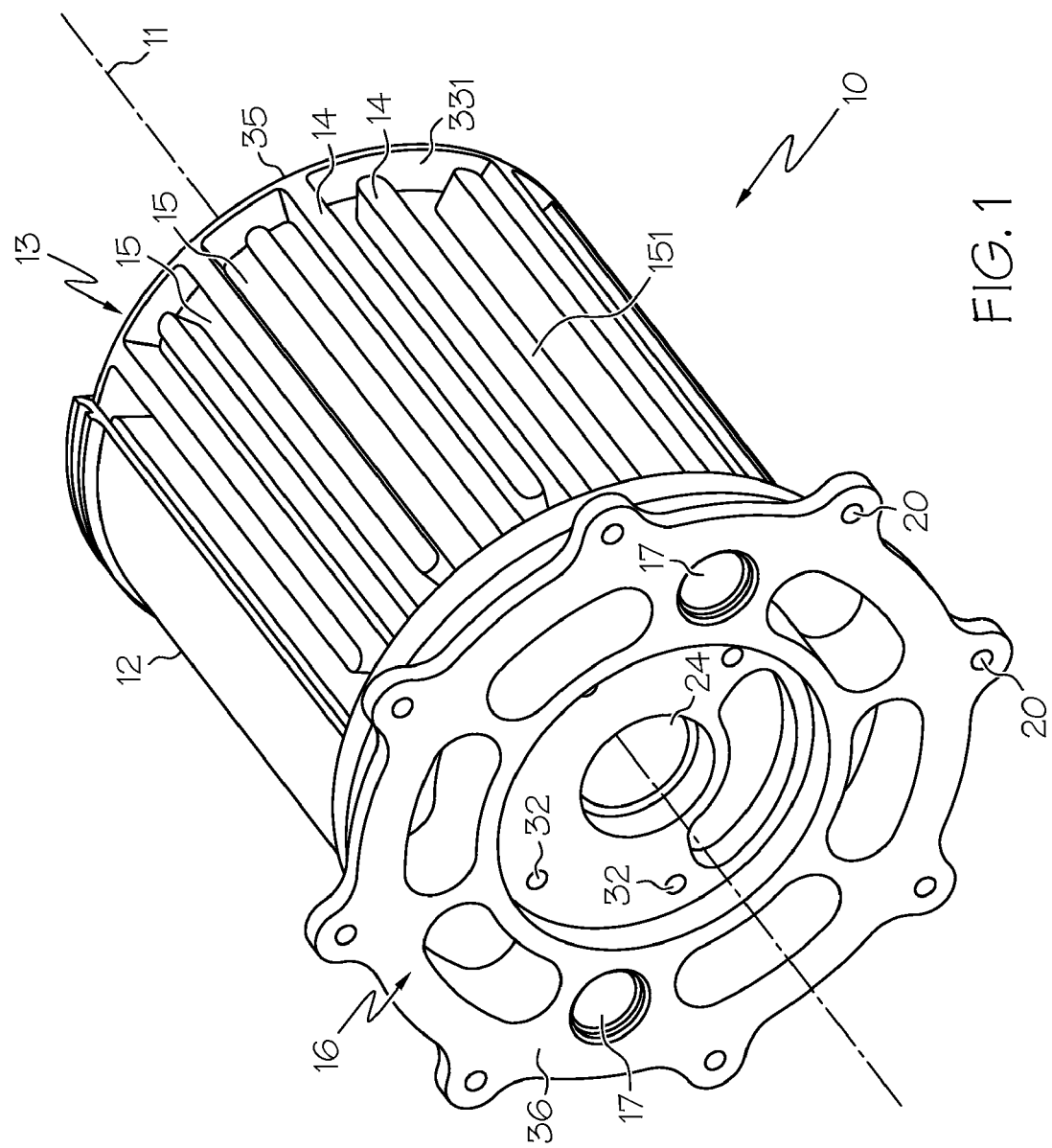
FIG. 1 is a perspective cut-away view of an electric motor cooling jacket according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a cooling jacket of a dry-liquid cooled electric motor or generator and a method for dry liquid cooling an electric motor or generator. In one embodiment, the present invention provides a cooling jacket of an electric motor or generator that is leak proof and pressure tight, that has a compact design that eliminates the need for "o"-rings, that can be manufactured at a low cost, and that may be easily assembled and integrated into an electrically driven machine, such as an electrically driven compressor. An embodiment of the present invention provides a cooling jacket that is suitable for, but not limited to, applications in the aircraft and aerospace industries, for example, in air-conditioning systems. The cooling jacket and method for dry liquid cooling an electric motor or generator as in one embodiment of the present invention may be suitable, but not limited to, cooling a high power density electric motor or generator. Furthermore, the cooling jacket as in an embodiment of the present invention may be used in connection with any electric motor or generator that requires dry liquid cooling.

In contrast with the prior art, where a variety of seals and "o"-rings are used to seal the inner and outer parts of the cooling jacket, the cooling jacket as in one embodiment of the present invention consists of only two parts, an inner sleeve and an outer sleeve that are connected to each other by two weld joints to form a leak proof and pressure tight cooling jacket. Therefore, by using the cooling jacket as in one embodiment of the present invention, prior art seals and "o"-rings may be eliminated along with the risk of leakage.

In further contrast to the prior art where iron-based materials are used, the cooling jacket as in one embodiment of the present invention may be manufactured out of aluminum or aluminum alloys that are suitable for pressure die casting, investment casting, or injection molding. By using aluminum or aluminum alloys, the susceptibility to corrosion may be reduced and over time loss of heat transfer capability caused by corrosion products may be prevented. Also, by using aluminum and aluminum alloys, the cooling jacket as in one embodiment of the present invention may be lightweight.

In still further contrast to prior art cooling jackets that typically are machined, a casting process, such as pressure die casting, investment casting, or injection molding, may be used to manufacture the cooling jacket as in one embodiment of the present invention. Using a casting or molding process to manufacture the cooling jacket as in one embodiment of the present invention may allow reducing the number of parts that need to be assembled to two, whereas prior art cooling jackets often include more than two parts that need to be assembled. Furthermore, using a casting or molding process to manufacture the cooling jacket instead of prior art machining may enable building features—such as an integrated bearing housing and an integrated stop for the stator iron stack—directly into the cooling jacket as in one embodiment of the present invention. Integration of such features may enable simple and easy integration of the cooling jacket as in one embodiment of the present invention into an electrically driven machine, such as a compressor. Since bearing alignments are crucial in the assembly of an machine, integrating installation guides and bearing housings into the cooling jacket as in one embodiment of the present invention may also eliminate the need to match set housings during the installation process of the cooling jacket into the electrically driven machine, for example, a cabin air compressor of an aircraft. Consequently, the manufacturing and installation costs of the cooling jacket as in one embodiment of the present invention may be reduced compared to manufacturing and installation costs of prior art cooling jackets.

In still further contrast to the prior art where channels in which the cooling liquid moves are often arranged radially and the cooling liquid travels circumferentially in the helical channels, the inner sleeve of the cooling jacket as in one embodiment of the present invention may include fins that form axially oriented passageways in which the cooling liquid may travel circumferentially in an axial direction. When the cooling liquid enters and exits the cooling jacket axially and when the cooling liquid travels axially within the cooling jacket, as in one embodiment of the present invention, then the pressure loss within the liquid cooling loop may be minimized. Still further, the passageway as in one embodiment of the present invention enables the cooling liquid to stay and travel within the cooling jacket for a longer time, increasing the efficiency of the heat transfer from the stator to the cooling jacket compared to prior art cooling jackets.

Referring now to FIG. 1, a perspective view of a cooling jacket 10 of an electric motor 40 (shown in FIG. 5) is illustrated according to an embodiment of the present invention. The cooling jacket 10 may also be used for cooling an electric generator 40. The cooling jacket 10 may extend longitudinally along an axis 11 from a front end 35 to a back end 36. The cooling jacket 10 may include an outer sleeve 12 shown cut away and an inner sleeve 13. The outer sleeve 12 and the inner sleeve 13 may both have a cylindrical shape and may extend coaxially along the axis 11. The outer sleeve 12 may surround the inner sleeve 13 forming a circular space 19 between the outer sleeve 12 and the inner sleeve 13.

Figure 3:
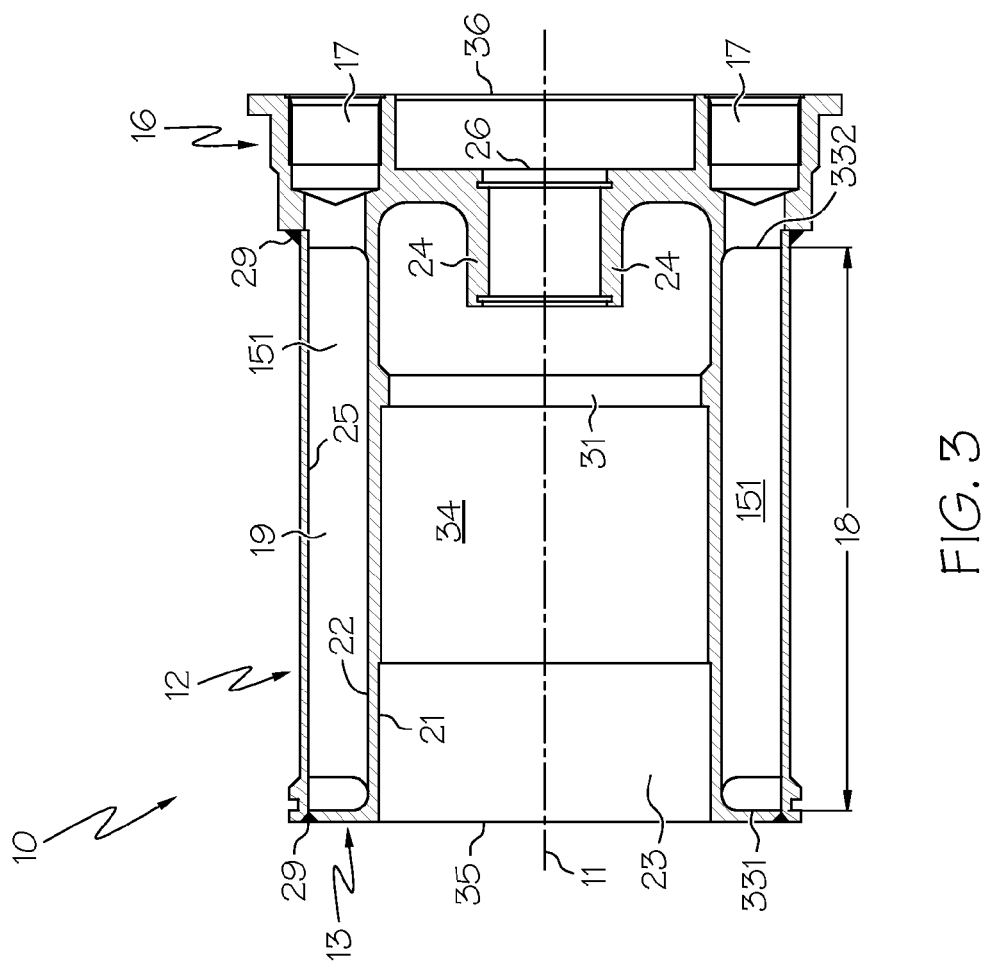
FIG. 3 is a cross-sectional side view along line 3-3 of the electric motor cooling jacket of FIG. 2.

The inner sleeve 13 may have a cylindrical outer surface 22 that may extend axially from the front end 35 for a length 18 (FIG. 3). A first vertical wall 331 may extend vertically at the front end 35 and a second vertical wall 332 may extend vertically proximate to the backend 36. Walls 331 and 332 may define the length 18. The inner sleeve 13 may include a plurality of fins 14 that may extend vertically from the outer surface 22 (shown in FIG. 3) into the circular space 19 (shown in FIG. 3) along the circumference of the inner sleeve 13. The fins 14 may be positioned in an interlocking-finger arrangement to form a passageway 15. The passageway 15 may allow a cooling liquid 30 (FIGS. 4B and 5) to travel axially along the circumference of the inner sleeve 13. The passageway 15 may be a continuous winding path that extends axially along the circumference of the inner sleeve 13 within the circular space 19 and that enables the cooling liquid 30 to travel axially back and forth over the length 18 (shown in FIG. 3) of the inner sleeve 13 along the circumference of the inner sleeve 13. The cooling liquid 30 may be a water-based liquid coolant, for example, a propylene glycol water (PGW) coolant that may contain about 60% propylene glycol and about 40% water.

At the back end 36, the inner sleeve 13 may include an end section 16. The end section 16 may include two openings 17 positioned across from each other. Each of the openings 17 may provide access to the space 19 (shown in FIG. 3) between the outer sleeve 12 and the inner sleeve 13 and to the passageway 15. Each of the openings 17 may be used as either an inlet or an outlet for the cooling liquid 30, whereas always a first opening 17 may function as an inlet for the cooling liquid 30 and the other, second opening 17 may function as an outlet for the cooling liquid 30, concurrently. Each of the openings 17 may be in fluid connection with a portion 151 of the passageway 15. The passageway 15 may include two portions 151 leading either to or from the openings 17 that may have a larger width than the remaining portions of the passageway 15.

Figure 5:
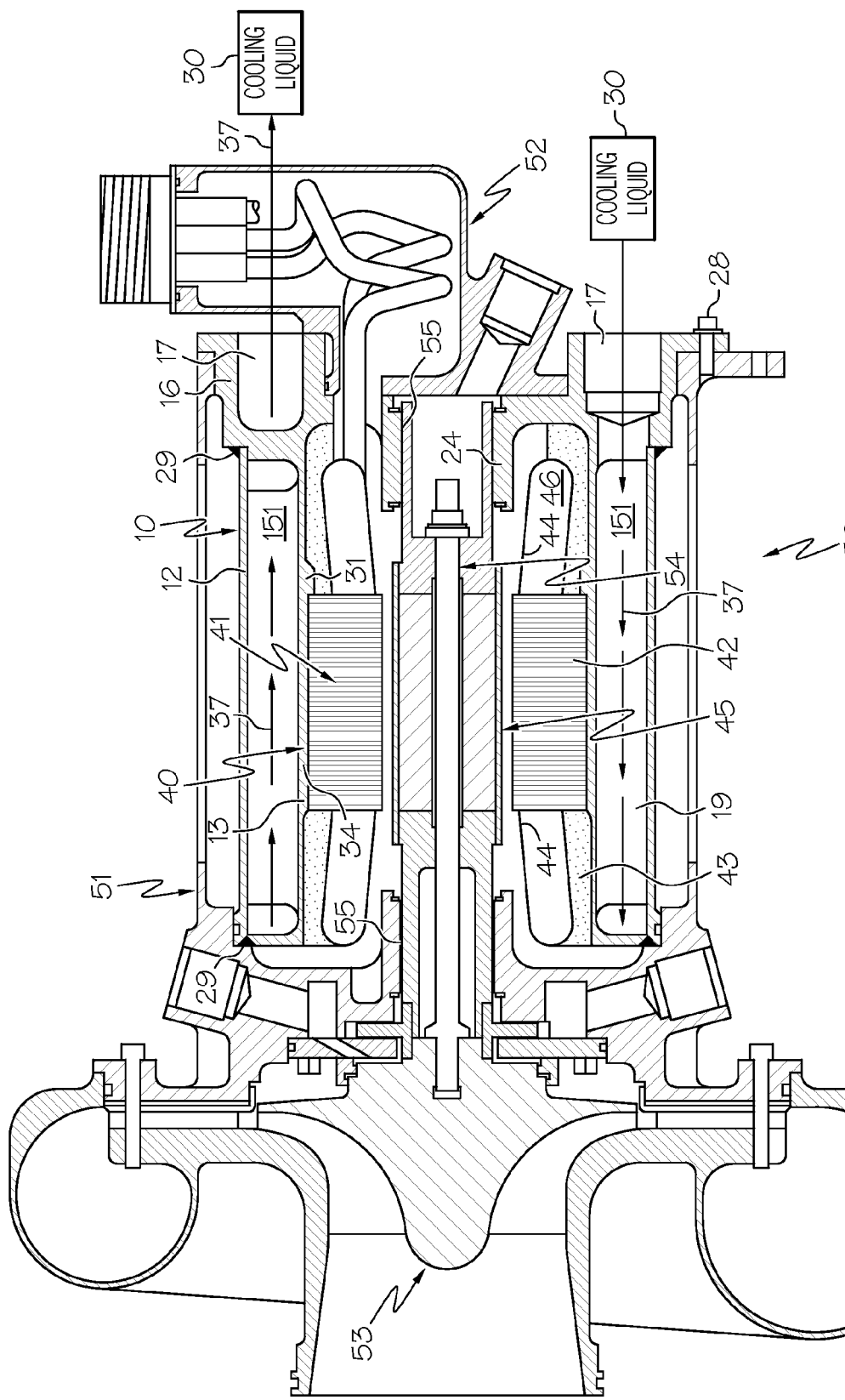
FIG. 5 is a schematic cross-sectional side view of an electrically driven compressor according to an embodiment of the present invention.

The end section 16 may further include mounting holes 20 and 32 that assist integration of the cooling jacket 10 into an electrically driven machine, such as a compressor 50 (as shown in FIG. 5). The inner sleeve 13 may further have a cylindrical inner surface 21 that forms a hollow space 23 for receiving a stator 41 of an electric motor or generator 40 (shown in FIG. 5). The inner sleeve 13 may further include a cylindrical bearing housing 24 axially placed within the hollow space 23 proximate to the end section 16 (also shown in FIG. 3).

The outer sleeve 12 may have a smooth cylindrical inner surface 25 and may be coaxially disposed around the inner sleeve 13. The outer sleeve 12 may fit tight on the inner sleeve 13 but may not completely seal the passageways 15 and 151. Each, the outer sleeve 12 and the inner sleeve 13, may be manufactured as a single piece cast during pressure die-casting, investment casting, or injection molding. The outer sleeve 12 and the inner sleeve 13 may be manufactured from aluminum and aluminum alloys.

Figure 2:
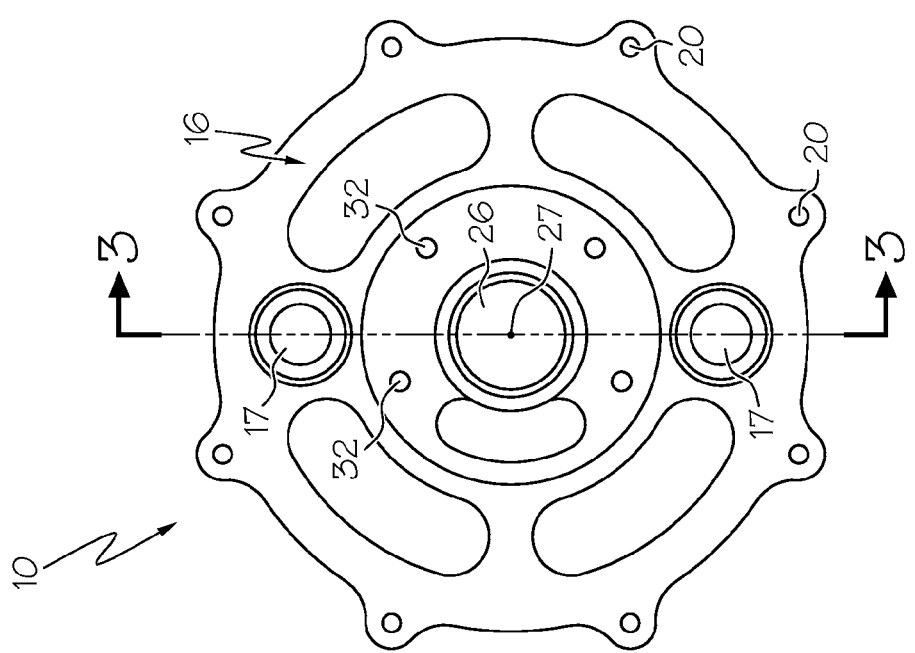
FIG. 2 is a rear view of an electric motor cooling jacket according to an embodiment of the present invention.

Referring now to FIG. 2, a rear view of the cooling jacket 10 of the electric motor or generator 40 (shown in FIG. 5) is illustrated according to an embodiment of the present invention. Shown in FIG. 2 is the end section 16 including the openings 17, the opening 26 of the bearing housing 24, and the mounting holes 20 and 32. The opening 26 of the bearing housing may be positioned in the center 27 of the cooling jacket 10. The mounting holes 20 may be evenly distributed along the circumference of the end section 16 in close proximity to the outer edge of the end section 16. Mounting holes 20 may receive bolts 28 (FIG. 5) and mounting holes 20 and 32 may assist the installation of the cooling jacket 10 in the compressor 50 (FIG. 5). A line 3-3 may vertically advance through the center 27 of the cooling jacket 10. As can be seen, the openings 17 may be centered on the line 3-3.

Referring now to FIG. 3, a cross-sectional side view along line 3-3 of the cooling jacket 10 of FIG. 2 is illustrated according to an embodiment of the present invention. FIG. 3 is a vertical cross-section through the center of the openings 17. The cooling jacket 10 may extend axially from a front end 35 to a back end 36. An end section 16 may be positioned at the back end 36. As shown, each opening 17 may be in fluid connection with a portion 151 of the passageway 15. The bearing housing 24 may be integrated in the inner sleeve 13 in close proximity to the end section 16 and may extend coaxially along axis 11. The outer sleeve 12 may be coaxially disposed around the inner sleeve 13. Two weld joints 29 may secure the outer sleeve 12 to the inner sleeve 13 and may hermetically seal the circular space 19 between the outer sleeve 12 and the inner sleeve 13. The first weld 29 joint may be positioned where the outer sleeve 12 meets the end section 16 of the inner sleeve 13 and the second weld joint 29 may be positioned where the outer sleeve 12 meets the vertical wall 331 that may be positioned opposite from the front end 35. By permanently attaching the outer sleeve 12 to the inner sleeve 13 with two weld joints 29, the cooling jacket 10 may be pressure tight and leak proof.

The cylindrical inner surface 21 of the inner sleeve 13 may include a stator stop 31, which may be an axially extending area of the inner surface that may have a smaller diameter than the adjacent areas. The stator stop 31 may contact an end of the stator 41 of the electric motor or generator 40 (FIG. 5). By integrating the stator stop 31 in the cooling jacket 10, the installation of the cooling jacket 10 on the electric motor or generator 40 may be simplified. The inner surface 21 may further include an axially extending section 34 for receiving the iron stack 42 (FIG. 5) of an electric motor or generator 40. The section 34 may be positioned adjacent to the stator stop 31 and between the front end 35 and the stator stop 31 and may have a diameter that may be larger than the diameter of the stator stop 31. The diameter of the section 34 may be chosen such that the section 34 is in direct contact with the iron stack 42 (FIG. 5).

Figure 4A:
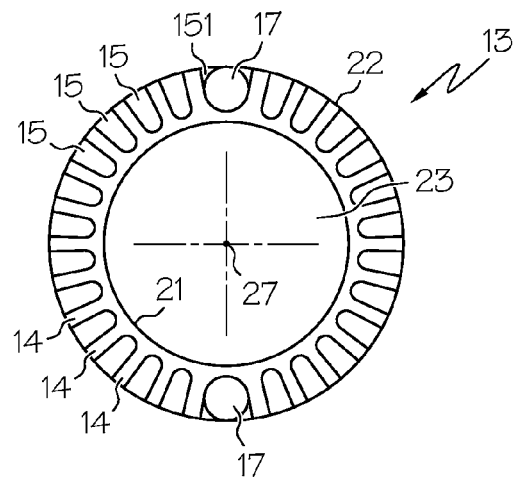
FIG. 4A is a cross-sectional front view of an inner sleeve of a cooling jacket according to an embodiment of the present invention.
Figure 4B:
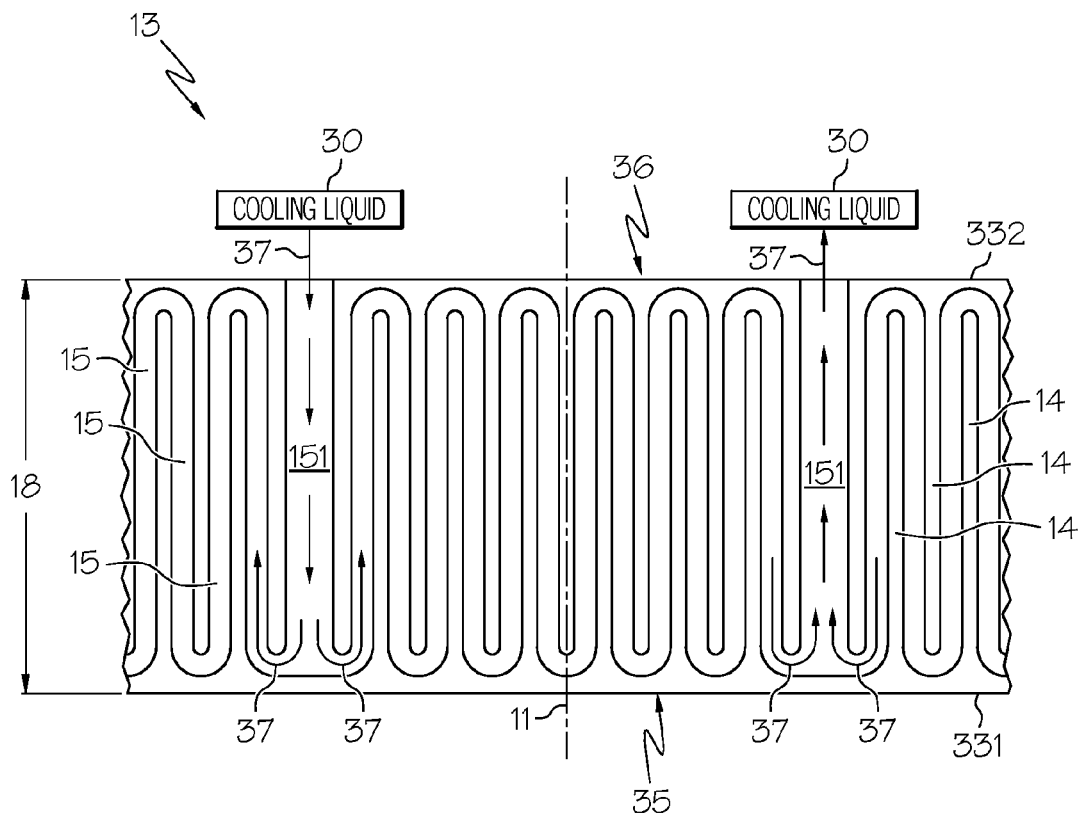
FIG. 4B is a spread-out top view of an inner sleeve of a cooling jacket according to an embodiment of the present invention.

Referring now to FIGS. 4A and 4B, a cross-sectional front view and a spread-out top view of an inner sleeve 13 of a cooling jacket 10 is illustrated, respectively, according to an embodiment of the present invention. As can be seen, the fins 14 may be arranged in parallel to each other. The fins 14 may extend axially in the direction of the axis 11 covering most of the length 18 of the inner sleeve 13. The fins 14 may alternate ending short of the wall 331 and the wall 332. Each two fins 14 that are positioned next to each other may define a portion of the passageway 15 therebetween.

The passageway 15 may be a continuous winding path that extends around the circumference of the inner sleeve 13. A cooling liquid 30 may axially travel along the passageway 15 back and forth over the entire length 18. The cooling liquid 30 may enter the passageway 15 at one of the opening 17 and may flow in the direction indicated by arrows 37 toward the other opening 17. The portions 151 of the passageway 15 where the cooling liquid 30 may enter or exit the passageway 15 may have a width that may be wider than the remaining portions of the passageway 15. The cooling liquid 30 may enter the passageway 15 though a first opening 17, which may extend through the wall 332. The cooling liquid 30 may travel axially within a first portion 151 of the passageway 15 towards the wall 331 at the front end 35 of the cooling jacket 10. Due to the narrowing of the passageway 15 when leaving the first portion 151, the flow of the cooling liquid 30 may split and the cooling liquid 30 may travel in the passageway 15 to the right and to the left simultaneously. The cooling liquid 30 may travel simultaneously in both directions, to the left and to the right, along the circumference of the inner sleeve 13 in axial direction back and forth until it reaches the second portion 151 of the passageway 15 leading to the second opening 17. Since the cooling liquid 30 arrives at the second portion 151 from the left and from the right it may be forced to enter the second portion 151 and to travel in axially direction towards the second opening 17, which may extend through the wall 332. As can be seen, the cooling liquid 30 may enter the passageway 15 of the cooling jacket 10 axially from the back end 36. The cooling liquid 30 may further exit the passageway 15 of the cooling jacket 10 through the back end 36. Either opening 17 may be used as exit or entrance for the cooling liquid 30. The flow 37 of the cooling liquid 30 is independent from the position, such as vertical or horizontal, of the openings 17 and, therefore, the cooling jacket 10 may be suitable for applications in the aerospace industry. By axially traveling back and forth, the cooling liquid 30 may stay for a relatively long time within the passageway 15, which may enable relatively high heat transfer efficiency.

Referring now to FIG. 5, a schematic cross-sectional side view of an electrically driven compressor 50 is illustrated according to an embodiment of the present invention. The compressor 50 may include an electric motor 40, a compressor housing 51, a connector housing 52, a compressor wheel 53, a tie rod 54, and bearings 55. The electric motor 40 may include a cooling jacket 10, a stator 41 having an iron stack 42 and a winding 46 with end turns 44, and a rotor 45. The tie rod 54 may connect the compressor wheel 53 with the rotor 45 of the motor 40. The cooling jacket 10 may be integrated in the assembly of the compressor 50 and may be sandwiched between the compressor housing 51 and the connector housing 52. Bolts 28 may secure the cooling jacket 10 to the compressor housing 51 via mounting holes 20. The connector housing 52 may be connected to the cooling jacket 10 utilizing mounting holes 32. The compressor 50 may be any type of electrically driven compressor, such as an air compressor, that uses dry liquid cooling.

The axially extending section 34 of the inner surface 21 of the inner sleeve 13 may be in direct contact with the outer diameter of the iron stack 42 of the stator 41. The remaining inner surface 21 of the inner sleeve 13 may be in contact with a potting material 43. The potting material 43 may fill the space between end turns 44 of the stator winding 46 and the inner surface 21 of the inner sleeve 13 of the cooling jacket 10. Through indirect contact, the cooling liquid 30 axially traveling in the passageway 15 of the cooling jacket 10 in the direction indicated by arrows 37 may draw heat from the stator 41 including the stator iron stack 42 the winding 46, and the end turns 44 of the stator winding 46. The length 18, over which the cooling liquid 30 may axially travel, may cover the entire length of the iron stack 42 and the stator winding 46 including end turns 44, which may enable a relatively high heat transfer efficiency.

As can be seen in FIG. 5, the bearing housing 24 may be integrated into the inner sleeve 13 of the cooling jacket 10 and may be sized to receive the bearings 55, which may be, for example, air-foil bearings. The bearing housing 24 may assist the bearing alignment during assembly of the compressor 50 and may, therefore, eliminate the need to match set housings, for example, the compressor housing 51, the connector housing 52, the bearing housing 24 and a cooling housing, such as the cooling jacket 10.

Figure 6:
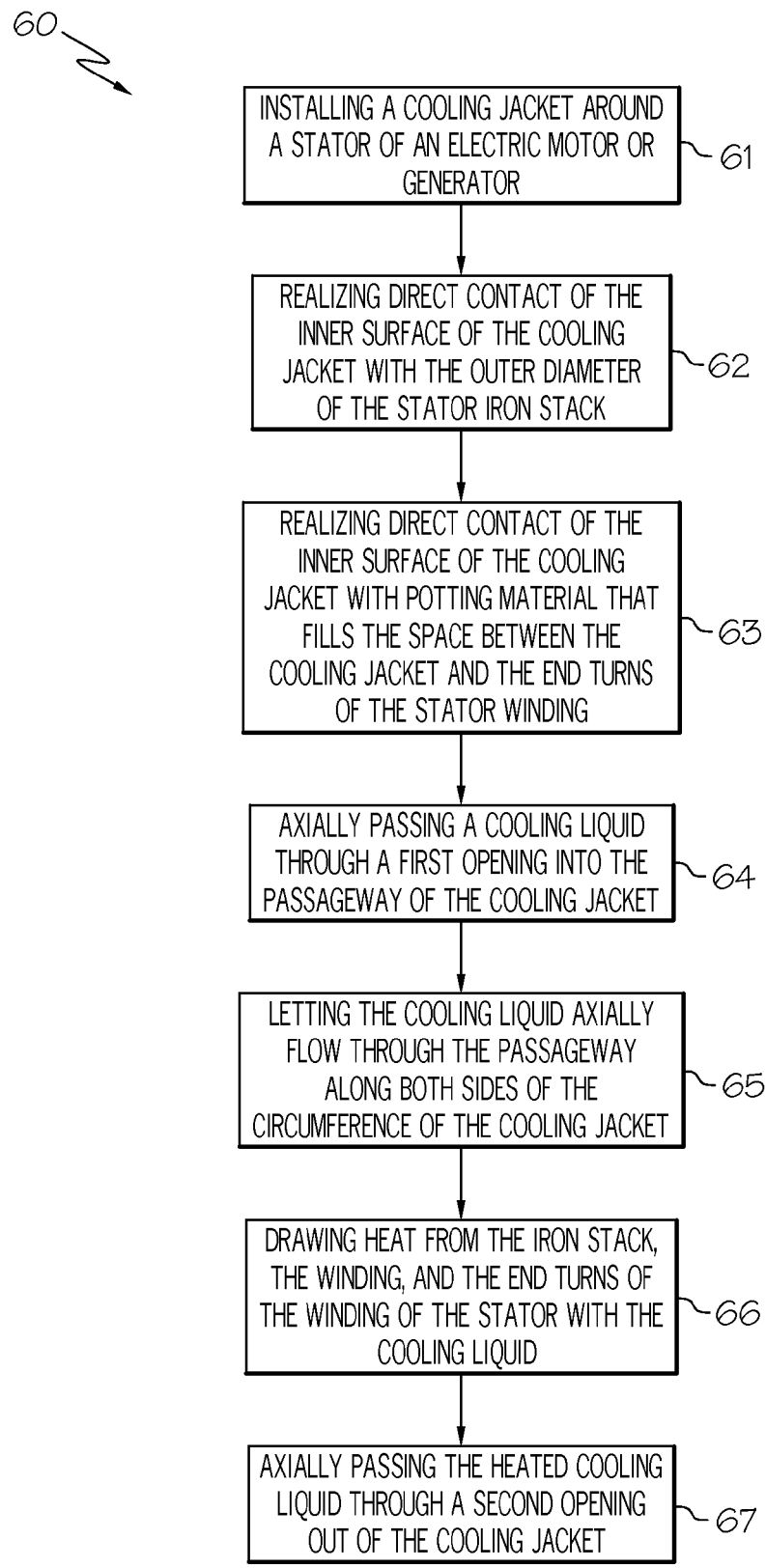
FIG. 6 is a flow chart representing a method for dry liquid cooling an electric motor according to an embodiment of the present invention.

Referring now to FIG. 6, a flow chart representing a method 60 for dry liquid cooling an electric motor or generator 40 is illustrated according to an embodiment of the present invention. The method 60 may involve a step 61 where a cooling jacket 10 may be installed around a stator 41 an electric motor or generator 40. In a following step 62, direct contact of the inner surface 21 of the inner sleeve 13 of the cooling jacket 10 with the outer diameter of the iron stack 42 of the stator 41 may be realized. Further realized may be direct contact of the inner surface 21 of the inner sleeve 13 of the cooling jacket 10 with potting material 43 in a step 63. The potting material 43 may fill the space between the inner surface 21 of the inner sleeve 13 of the cooling jacket 10 and the end turns 33 of the winding 46 of the stator 41.

A step 64 may involve axially passing a cooling liquid 30 from the back end 36 of the cooling jacket 10 through a first opening 17 into the passageway 15. A following step 65 may involve letting the cooling liquid 30 axially flow through the passageway 15 along both sides of the circumference of the inner sleeve 13 of the cooling jacket 10.

In a step 66, heat may be drawn from the iron stack 42, the winding 46, and the end turns 44 of the winding 46 with the cooling liquid 30. In a final step 67, the now heated cooling liquid 30 may axially pass through a second opening 17, which may be positioned at the back end 36 of the cooling jacket 10 and across from the first opening 17, out of the cooling jacket 10. By installing the cooling jacket 10 at the outer diameter and in direct contact with the stator 41 of an electric motor or generator 40 as in one embodiment of the present invention, the stator 41 may be kept cool and dry during operation of the electric motor or generator 40.

It should be understood, of course, that the foregoing relates to exemplary embodiments of the invention and that modifications may be made without departing from the spirit and scope of the invention as set forth in the following claims.

We claim:

1. A cooling jacket, comprising:
 a cylindrical inner sleeve;
 a cylindrical outer sleeve, wherein said outer sleeve coaxially surrounds said inner sleeve as a single die-cast piece forming a circular space between said outer sleeve and said inner sleeve and wherein said inner sleeve includes a cylindrical inner surface and a cylindrical bearing housing, wherein said circular space is hollow and receives a stator of an electric motor or generator and wherein said stator includes windings and end turns of the windings, and wherein said bearing housing is axially placed within said circular space;
 a passageway extending within said circular space between said outer sleeve and said inner sleeve, wherein said passageway is a continuous winding path that extends axially back and forth along the circumference of said inner sleeve; and
 a potting material disposed between the end turns of the windings and the cylindrical inner surface of the inner sleeve.

2. The cooling jacket of claim 1, wherein said inner sleeve includes a cylindrical outer surface and a plurality of fins, wherein said fins extend vertically from said outer surface into said circular space between said outer sleeve and said inner sleeve, and wherein said fins are positioned in an interlocking-finger arrangement and form said passageway.

3. The cooling jacket of claim 1, wherein said outer sleeve is permanently attached to said inner sleeve by exactly two weld joints and wherein said two weld joints hermetically seal said circular space between said outer sleeve and said inner sleeve.

4. The cooling jacket of claim 1, wherein said inner sleeve includes an end section, wherein said end section includes two openings positioned across from each other, wherein each of said two openings provides access to said circular space between said outer sleeve and said inner sleeve and to said passageway, wherein a first of said two openings is an inlet for a cooling liquid, and wherein a second of said two openings is an outlet for said cooling liquid.

5. The cooling jacket of claim 1, wherein said inner sleeve includes an end section, wherein said end section includes a plurality of mounting holes, wherein said mounting holes assist integration of said cooling jacket into an electrically driven machine.

6. The cooling jacket of claim 1, wherein said outer sleeve includes a smooth cylindrical inner surface, and wherein outer sleeve fits tight around said inner sleeve.

7. The cooling jacket of claim 1, wherein said outer sleeve and said inner sleeve are a single investment cast piece or injection molded piece.

8. The cooling jacket of claim 1, wherein said outer sleeve and said inner sleeve are manufactured out of aluminum or aluminum alloy.

9. The cooling jacket of claim 1, further including a stator stop, wherein said stator stop is an axially extending area of an inner surface of said inner sleeve that has a smaller diameter that adjacent areas, and wherein said stator stop contacts an end of a stator of said electric motor or generator.

10. A cooling jacket of a dry-liquid cooled electric motor or generator, comprising:
   a cylindrical inner sleeve extending longitudinally along an axis, wherein said inner sleeve forms a cylindrical hollow space, and wherein said hollow space receives a stator of said electric motor or generator wherein said inner sleeve includes non-axially extending portions and wherein a potting material is disposed between the non-axially extending portions and the stator;
   a cylindrical outer sleeve, wherein said outer sleeve coaxially surrounds said inner sleeve forming a circular space between said outer sleeve and said inner sleeve;
   a first and a second weld joint, wherein said first and said second weld joint permanently attach said outer sleeve to said inner sleeve and hermetically seal said circular space between said outer sleeve and said inner sleeve;
   a plurality of fins that form a passageway, wherein said passageway is a continuous winding path that extends axially back and forth along the circumference of said inner sleeve within said circular space between said outer sleeve and said inner sleeve;
   a first opening and a second opening, wherein said first and second opening are positioned across from each other, and wherein said first and second opening provide access to said circular space between said inner sleeve and said outer sleeve and are in fluid connection with said passageway;
   a cylindrical bearing housing, wherein said bearing housing is integrated into said inner sleeve and is axially placed within said hollow space formed by said inner sleeve, and wherein said bearing housing receives a bearing of said electric motor or generator; and
   a stator stop, wherein said stator stop is an axially extending area of said inner surface of said inner sleeve that has a smaller diameter that adjacent areas, and wherein said stator stop contacts an end of a stator of said electric motor or generator.

11. The cooling jacket of claim 10, wherein said fins are arranged in parallel to each other, wherein said fins are positioned in an interlocking-finger arrangement, wherein said fins extend axially along and vertically from said outer surface within said circular space, wherein each two fins define a portion of said passageway.

12. The cooling jacket of claim 10, wherein said inner sleeve extends from a front end to a back end, wherein said inner sleeve includes an end section at said back end and a cylindrical outer surface, wherein said outer surface extends for a length from a first wall located at said front end to a second wall located proximate to said end section, and wherein said first and second opening are included in said end section.

13. The cooling jacket of claim 12, wherein said fins coverer most of said length of said outer surface of said inner sleeve, and wherein said fins alternate ending short of said first wall and said second wall.

14. The cooling jacket of claim 10, wherein said passageway includes a first and second portion each having a larger width than the remainder of said passageway, wherein said first portion is in fluid connection with said first opening, and wherein said second portion is in fluid connection with said second opening.

15. The cooling jacket of claim 10, wherein said inner surface of said inner sleeve further includes an axially extending section, wherein said axially extending section receives said stator of said electric motor or generator, and wherein said axially extending section realizes direct contact between said cooling jacket and said stator.

* * * * *